United States Patent
Lin

[11] Patent Number: 5,913,648
[45] Date of Patent: Jun. 22, 1999

[54] ROTATABLY FASTENING BLIND RIVET

[76] Inventor: Wei-Hwang Lin, Dept. Of Military Engr. Chinese Military Academy 830 R.O.C., Feng - Shan, Taiwan

[21] Appl. No.: 09/140,058

[22] Filed: Aug. 24, 1998

[51] Int. Cl.$^6$ .............................. F16B 13/04; F16B 13/06
[52] U.S. Cl. ................................... 411/43; 411/38; 411/55
[58] Field of Search ................................. 411/34, 37, 38, 411/43, 55, 57

[56] References Cited

U.S. PATENT DOCUMENTS

| | | | |
|---|---|---|---|
| 4,699,552 | 10/1987 | Jeal | 411/43 |
| 4,950,115 | 8/1990 | Sadri | 411/43 X |
| 5,152,648 | 10/1992 | Pratt | 411/43 |
| 5,238,342 | 8/1993 | Stencel | 411/43 |
| 5,498,110 | 3/1996 | Stencel et al. | 411/43 |

*Primary Examiner*—Neill Wilson

[57] ABSTRACT

A rotatably fastening blind rivet is provided. The blind rivet includes a tubular rivet body of ductile material and an elongate stem engaged into the rivet body which has a radially enlarged rivet head of hexagon configuration at one end having a serrated surface and a central bore, a threaded inner periphery of predetermined pitch and number of threads in an upper region and a progressively introversion inner periphery in a lower region of the body. The stem includes a cylinder shank of threaded outer periphery engageable with the threads of the rivet body, a breakneck on the top of the shank from which a tensioning rod of hexagon spiral outer periphery extends upward and is slidably engageable with the central bore of the rivet head and a terminal head of stiffness material at a lower end of the shank remote from the rod having serrated surface toward the shank. In installation, the tensioning rod is rotated mechanically or manually to provide proper torque to force the upward movement of the terminal head which in turn presses the tubular body to be radially deformed to become a blind head against a workpiece.

1 Claim, 5 Drawing Sheets

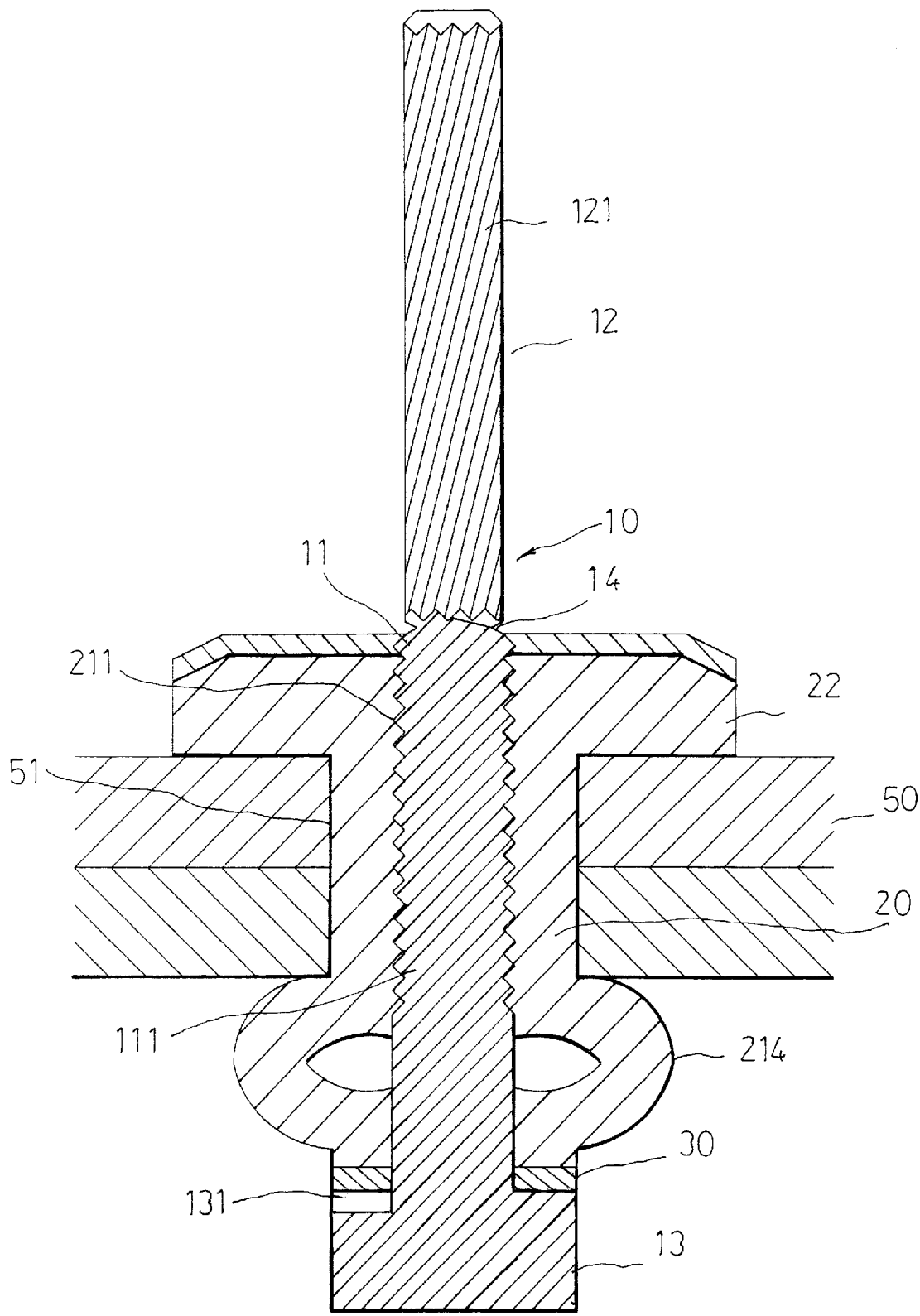
F I G. 3

ROTATABLY FASTENING BLIND RIVET

BACKGROUND OF THE INVENTION

The present invention relates to blind rivets and more particularly to a rotatably fastening blind rivet which is tensed by rotating a hexagon fastening rod inside a turbular body manually or mechanically and which provides greater clamp force to prevent the workpiece from becoming breakaway or looseness. Besides, it increases the fatigue strength so that the blind rivet will be more durable.

Blind rivet is useful to fasten two or more workpieces together in civil and mechanical engineering or in the high-tech aeronautic engineering which requires highest quality of the blind rivets.

U.S. Pat No. 4,639,174 discloses a self-plugging blind rivet which utilizes the clamp force of the rivet to fasten two or more workpieces together by axially applying pulling force to a stem to force a tubular body to be deformed so as to clamp the workpieces. Because the pulling force is mostly consumed with the displacement of the stem, it could not be totally transferred to the deformation of the tubular body, So it may cause a weak clamp force or poor fatigue strength for the rivet. Further, this blind rivet lacks threads formed between the stem and the tubular body, this also causes an uneven tensioning that the stem may be disconnected with the tubular body after a certain time of use.

U.S. Pat. No. 4,865,499 also discloses a self-plugging blind rivet in which thread is partially formed on a small region of the stem, so that the fastening of this rivet is performed by partially pulling and partially rotation of the stem. This improvement can provide greater clamp force that insures the rivet to be more durable and stabilized. However, it requires a twice operation that is not economical.

SUMMARY OF THE PRESENT INVENTION

The present invention has a main object to provide a rotatably fastening blind rivet which utilizes exterior rotation force to compressively force the rivet constituting a blind head which firmly clamps the workpieces and prevents the workpieces from becoming looseness or breakaway. The rotatably fastening a blind rivet can also increase the fatigue strength and the fatigue durability of the rivet.

Accordingly, the rotatably fastening blind rivet of the present invention comprises generally a tubular body, a stem axially engageable in the tubular body and a manual fastener member. The tubular body includes interior thread on an upper region and a large diameter hexagon rivet head on the top having a serrated outer face and a central bore. The stem includes a cylinder shank having peripheral thread made engageable with the thread of the tubular body, a hexagon fastening rod of spiral outer periphery axially connected to the top of the shank with a breakneck formed therebetween and a terminal head with a serrated inner surface connected to the lower end of the shank.

The stem of this rivet is previously assembled with the tubular body at manufacturing stage and will not break away because of that their threads are partially engaged with each other. In operation, first insert the rivet into a larger through hole of the workpieces and then rotate the hexagon fastening rod mechanically or manually until that the thread of the stem is totally engaged with the thread of the tubular body while the lower portion of the tubular body is pressed to constitute a blind head firmly clamping the surface of the workpieces and the fastening rod breaks off at the breakneck.

The features and advantages of the present invention will become more apparent by reference to the following detailed description thereof when read in conjunction with the attached drawings.

BRIEF DESCRIPTION OF THE DRAWINGS

FIG. 3 is a sectional view indicating that the threads between the stem and the tubular body are totally engaged and the lower portion of the tubular body is pressed to constitute a blind head against the surface of the workpiece.

DETAILED DESCRIPTION OF THE PREFERRED EMBODIMENT

Figure 1:
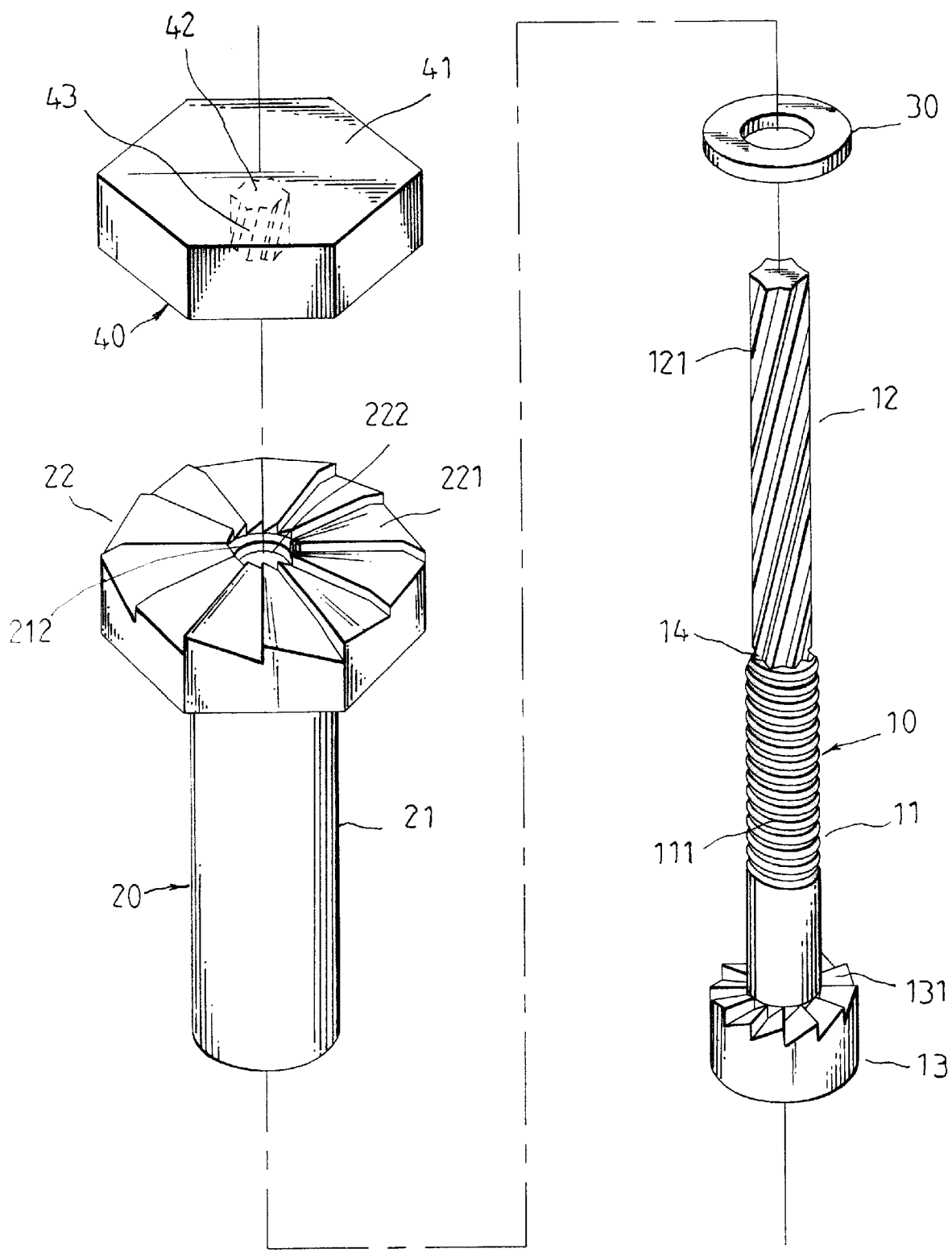
FIG. 1 is an exploded perspective view to show the preferred embodiment of the present invention.

With reference to FIG. 1, the rotatably fastening blind rivet of the present invention comprises generally a stem 10, a tubular body 20, a thrust washer 30, and a manual fastener 40.

The stem 10 which is the principal tensioning source of the rivet includes a cylinder shank 11 having peripheral threads 111 on an upper region, a hexagon tensioning rod 12 having a hexagonal spiral outer periphery 121 axially extended upward from the top of the shank 11 with a breakneck 14 previously formed therebetween, and a terminal head 13 integrated with the lower end of the shank 11 having a first serrated or non-slip surface toward the shank 11. Note that the hexagonal spiral 121 on the outer periphery of the tensioning rod 12 aims to facilitate the tensioning rod 12 of a ready and precise engagement with a fastener instrument and that the fastener instrument will not disengage with the tensioning rod 12 at rotation. In addition, the serrated surface 131 of the terminal head 13 is made from stiffness material and thrust to provide greater friction between the lower end of the tubular body 20 or the trust washer 30 and the terminal head 13 so as to urge the tubular body 20 for a proper deformation.

Figure 2:
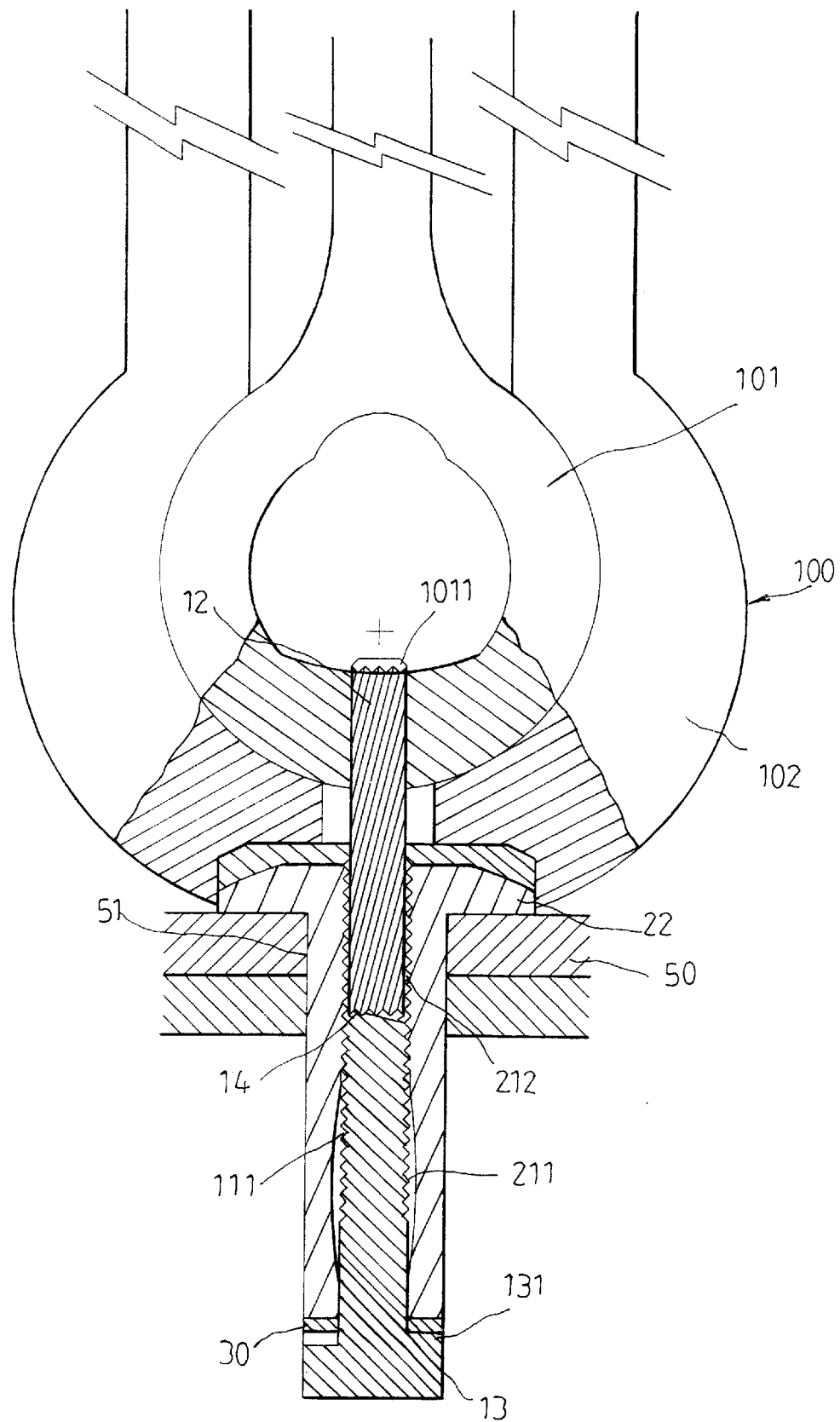
FIG. 2 is a sectional view to show an assemblage of FIG. 1 being applied to a workpiece and operated by a suitable instrument.

The tubular body 20 which is made from ductile material includes a hollow interior shank 21, a large diameter hexagon rivet head 22 on the top having a second serrated surface 221 on the top and a circular central bore 222 communicating to inside of the shank 21, a threaded inner periphery 212 on an upper region of the shank 21 made engageable with threads 111 of the cylinder shank 11 of the stem 10 and a progressively introversion region in the lower deformative portion of the shank 21 as shown in FIG. 2. Wherein the hexagon shape of the rivet head 22 and its second serrated surface 221 can prevent the fastener instrument 40 and 100 from an idle gripping, the pitch and the number of threads 111 and 212 of the stem 10 and the tubular body 20 are justable in accordance with the thickness of the workpiece and threads 111 and 212 control the fastener of an even rotation in order to prevent the breakneck from an earlier breaking.

The manual fastener 40 includes a hexagon body 41 engageable with rivet head 22 and a hexagon central recess 42 having a hexagonal spiral inner periphery 43 engageable with the hexagonal spiral outer periphery 121 of the tensioning rod 12. This mannual fastener is provided to be used at where a mechanical fastener instrument is inconvenient to do and which is operated with a pair of wrenches.

The thrust washer 30 is prepared to be engaged between the tubular body 20 and the terminal head 13 while the friction becomes unacceptably large.

The stem 10 is assembled with the tubular body at manufacturing stage while their threads 111 and 212 are partially engaged so that they will not break off.

Figure 4:
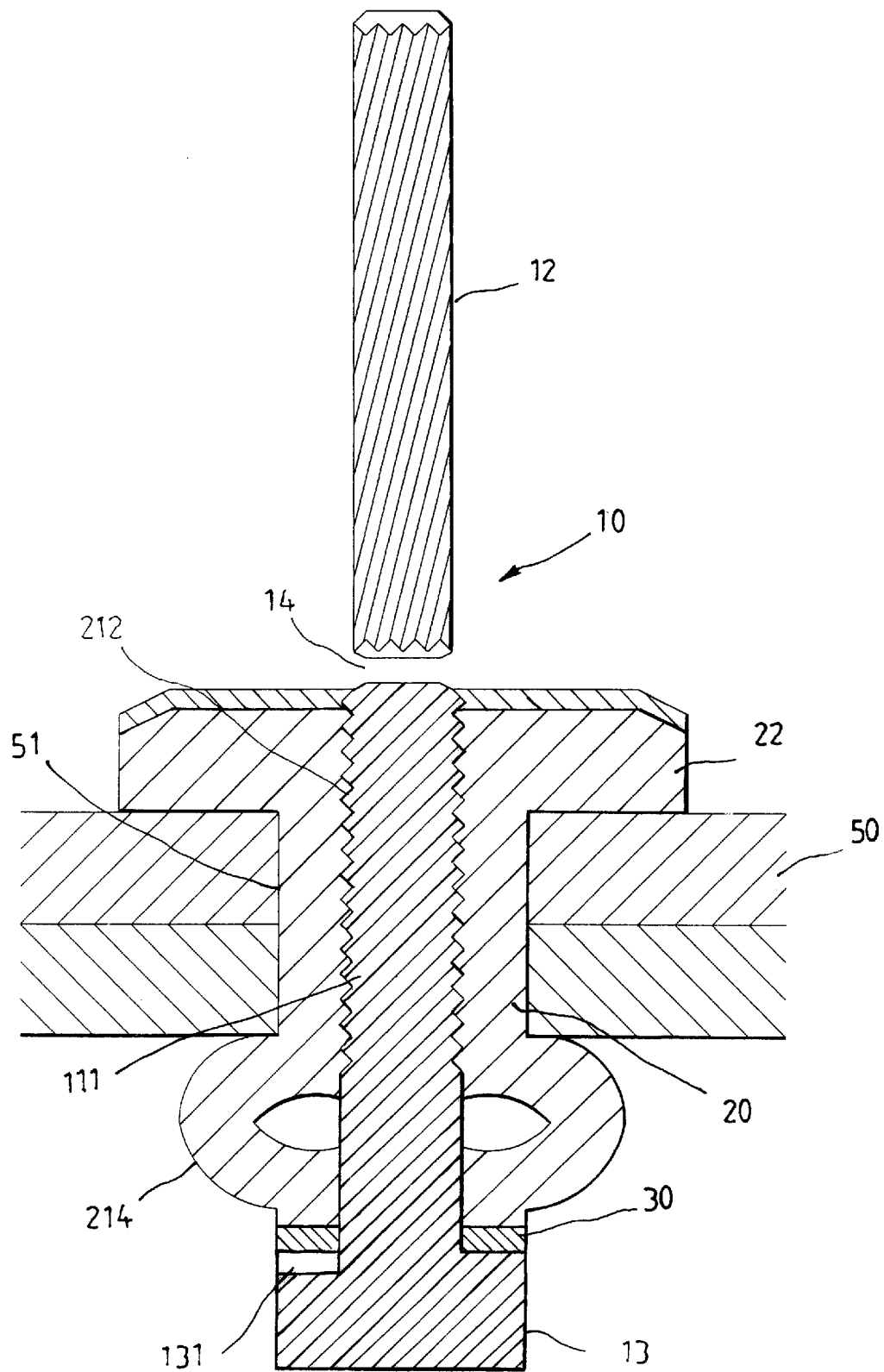
FIG. 4 is a sectional view of FIG. 3 while the hexagon fastening rod breaks off at the breakneck.

Referring to FIGS. 2 and 3, in installation, first make a thru hole 51 in the workpieces 50 diametrically slight larger than the outer diameter of the tubular body 20 and insert the assembled blind rivet through the thru hole 51 until that the underside of the rivet head 22 abuts the upper surface of the workpieces 50, then apply a mechanical fastener instrument 100 to the top of the blind rivet in the manner such that first engage the hexagon aperture 1011 of a rotatable arm 101 of the instrument 100 with the protrudent hexagon tensioning rod 12 on the top of the rivet, this is very easily to do because of the hexagonal spiral outer periphery 121 of the tensioning rod 12, and then engage a gripping arm 102 of the instrument 100 with hexagon rivet head 22 which is therefore stationary during the operation of the rotatable arm 101, because of the great friction on the serrated upper surface 221 of the rivet head 22 when rotates the rotatable arm 101, the stem 10 will be spirally moved upward, the threads 111 and 212 gradually engage each other and the terminal head 13 constantly presses the shank 21 of the tubular body 20 which first expands radially and then deforms into a blind head 214 abutting the lower surface of the workpieces 50 (as shown in FIG. 3). Continuous rotation of the rotatable arm 101, the tensioning rod 12 shall break away at the breakneck 14 (as shown FIG. 4) because the stem 10 becomes stationary under a greater friction between the shank 21 and the terminal head 13. No matter whether or not the trust washer 30 engages therebetween.

Figure 5:
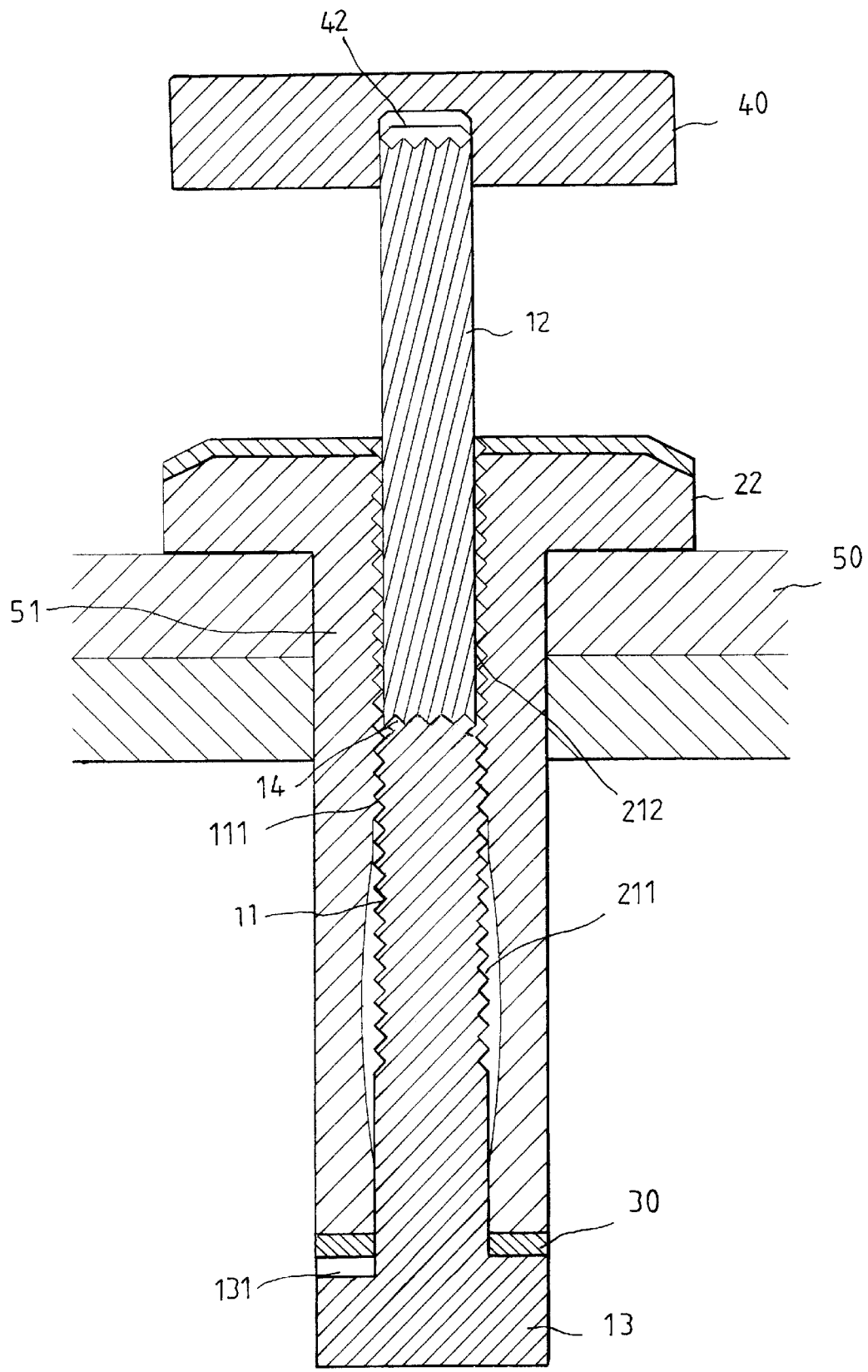
FIG. 5 is a sectional view indicating that the fastening axis is rotating by a manual fastener member.

Referring to FIG. 5, where the mechanical fastener instrument 100 is inconvenient to use, apply the hexagon central recess 42 of the manual fastener 40 to the tenioning rod 12 of the stem 10 and then use a pair of wrenches (not shown) to respectively clamp the manual fastener 40 and the rivet head 22, when wrenches the fastener 40 and keeps the rivet head stationary, the stem 10 will also move upward and the shank 21 under the pressure of the terminal head 13 becomes a blind head 214 either as described the above.

Based on the aforediscussed embodiment, the rotatably fastening blind rivet of the present invention provides the following advantages:

(1) The hexagonal spiral outer periphery of the tensioning rod 12 facilitates a ready and tight engagement of the rod 12 with the fastener instrument 100 so as to totally transfer the torque of the instrument to the rivet and provide complete clamp force to the rivet, (2) The threads 111 and 212 in the stem 10 and the tubular body 20 can prevent the rivet under constant stress from broken away or looseness and provide more reliable connection of workpieces than any prior art blind rivet.

(3) The serrated surface 131 of the terminal head 13 provide greater friction against the lower end of the tubular body 20 whether or not a thrust washer 30 engages therebetween before or after its deformation, and (4) The progressive introversion inner perphery 211 of the tubular body 20 provides a rapid and effective deformation of the tubular body 20.

Note that the specification relating to the above embodiment should be construed as exemplary rather than as limitative of the present invention, with many variations and modifications being readily attainable by a person of average skill in the art without departing from the spirit or scope thereof as defined by the appended claims and their legal equivalents.

I claim:

1. A rotatably fastening blind rivet comprising:

a stem including a cylinder shank having peripheral threads of pretermined number and pitch on an upper region and running into a breakneck on top of said shank, a hexagon tensioning rod axially extending upward from said breakneck having a hexagonal spiral outer periphery through the body, and a terminal head of stiffness material at a lower end of said shank remote from said tensioning rod and having a first serrated surface toward said shank;

a thrust washer selectively engaged with the first serrated surface of said terminal head;

a tubular rivet body of ductile material including a hollow interior shank for axially receiving said stem therein, a radially enlarged rivet head of hexagon configuration at one end of said hollow interior shank having a second serrated surface radially from on outward surface and a circular central bore communicating to inside of said tubular rivet body for slidably engaging with the tensioning rod of said stem, a threaded inner periphery of predetermined pitch and number of threads in an upper region engageable with the threads of said stem and a progessively introversion inner periphery in a lower region of said hollow interior shank;

whereby said hollow interior shank is radially deformed to a blind head upon rotation of said tensioning rod which is broken away at said breakneck after that the threads between said tubular body and said stem are all engaged.

\* \* \* \* \*